Figure 1:
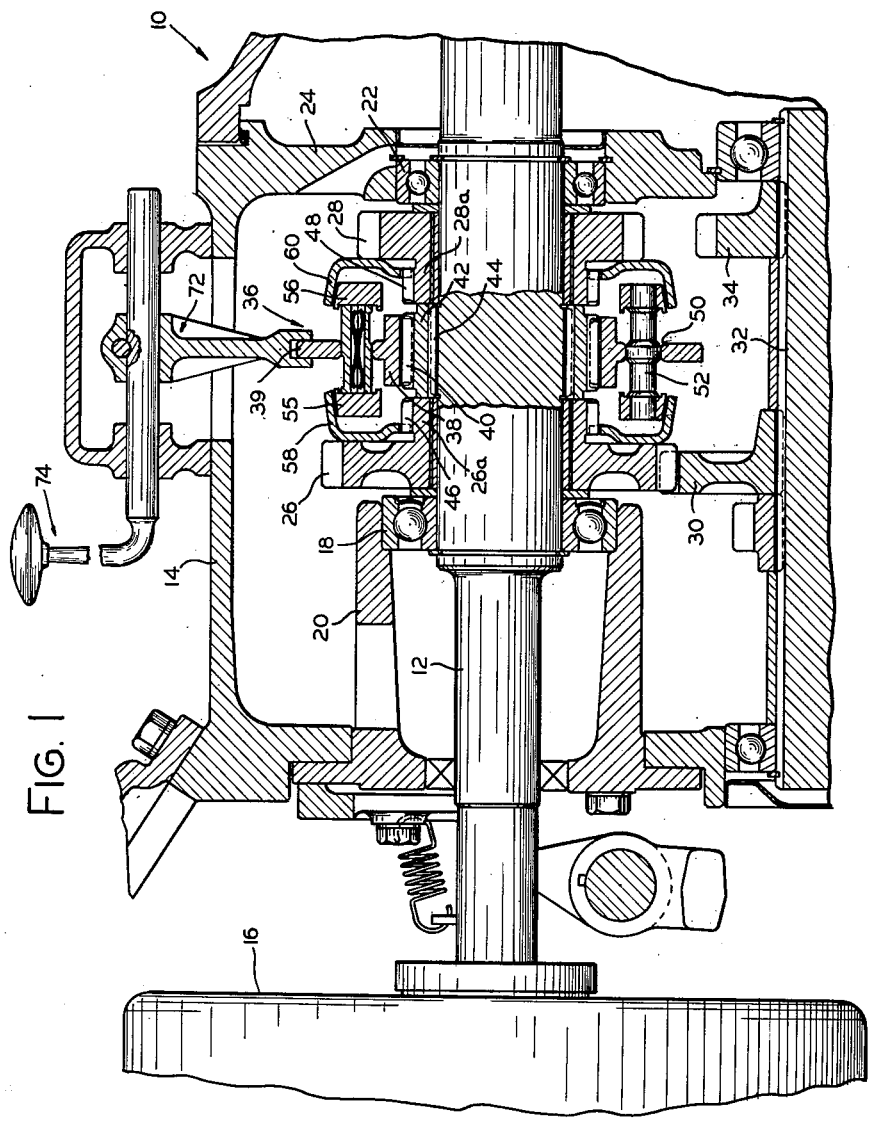

Feb. 26, 1963　　　E. E. EATON　　　3,078,975
SYNCHRONIZER

Filed June 19, 1961　　　3 Sheets-Sheet 1

*INVENTOR*
ERNEST E. EATON
BY
Kenneth C. Witt
ATTORNEY

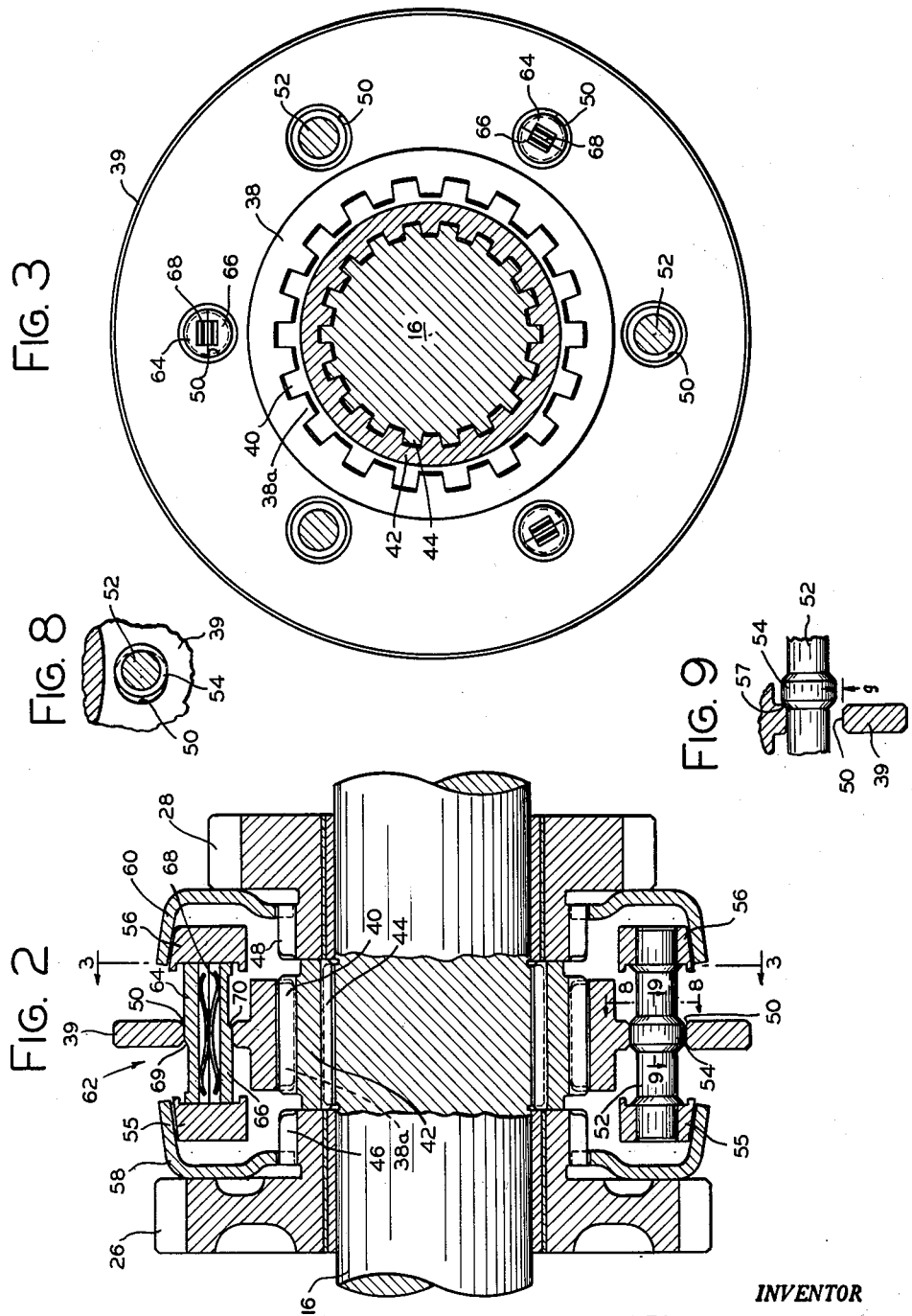

INVENTOR
ERNEST E. EATON
BY
Kenneth C. Witt
ATTORNEY

United States Patent Office 3,078,975
Patented Feb. 26, 1963

3,078,975
SYNCHRONIZER
Ernest E. Eaton, Jackson, Mich., assignor to Clark Equipment Company, a corporation of Michigan
Filed June 19, 1961, Ser. No. 117,989
14 Claims. (Cl. 192—53)

This invention relates to so-called "synchronizers" by which is meant a device or mechanism for synchronizing the speed and direction of rotation of two members so that they may be clutched together by a positive type clutch without clashing.

One of the most frequent uses for such synchronizer mechanisms is in gear type change-speed transmissions having gears which are constantly in mesh. In such transmissions it is necessary in order to change ratios to clutch a gear to the shaft upon which it is mounted, and this is commonly done by means of a jaw type or other positive clutch. In order to connect such gear to the shaft it is necessary to accelerate the gear if it is not rotating, or to change its speed and/or direction if it is already rotating, to the same speed and direction as the shaft in order that the positive clutch can be engaged without clashing or mismatch of the clutch teeth during and prior to engagement. In order to accomplish this, it is customary to employ a synchronizer mechanism which includes an auxiliary friction clutch. This friction clutch mechanism engages first and accelerates the gear or changes its speed and/or direction of rotation so that it is synchronized with the shaft, after which the positive clutch can be engaged without clashing.

It is characteristic of such synchronizer clutch mechanisms that they do not operate satisfactorily or at least do not operate as well when the vehicle and the transmission are at rest. When an attempt is made to engage the positive clutch under such circumstances, when there is no relative rotational motion between the two elements of the positive clutch, the teeth on the positive clutch elements may come into end to end or abutting relation. When this happens and there is no relative rotational motion between the two positive clutch elements, the effect of the friction clutch is to attempt to hold the teeth of the positive clutch elements in abutting relation thereby preventing the meshing of such teeth and the engagement of the positive clutch.

An example of one prior art synchronizer which is widely used is the synchronizer disclosed and claimed in Patent 2,667,955 Bixby, dated February 2, 1954, which is assigned to the same assignee as the present invention. The Bixby synchronizer has been very successful; however, it is not entirely satsifactory under certain conditions of operation when it is desired to accomplish the connection of a gear to its shaft when neither of these parts is in motion initially.

The object of the present invention is to provide a synchonizer mechanism which is fully effective to synchronize the gear with the shaft when one or both of these parts are rotating but which also allows the clutching of these two parts together satisfactorily when neither is rotating initially.

In one environment in which may invention is applicable, an axially slidable clutch collar is mounted on a splined portion of a rotatable shaft on which a pair of axially spaced gears are rotatably mounted adjacent the ends of the collar. The clutch collar is provided with jaw clutch teeth which are adapted to mesh with jaw clutch teeth on the rotatable gears for positively clutching a selected one of the gears to the shaft, while the collar member also has a neutral position or range in which it is not in mesh with either of the gears. The clutch collar is formed with a radially extending flange which has a plurality of circumferentially arranged apertures therethrough. Extending through certain of the openings in the flange of the clutch collar are pins which have synchronizer rings fixed at the ends of the pins, the synchronizer rings being adapted to cooperate with friction surfaces on the gears for synchronizing purposes under certain conditions. The pins have enlarged central portions which are positioned within the apertures in the flange when a non-synchronizing device is in the neutral position. Extending through other apertures in the flange are split pin devices which comprise two axially extending shell members and spreading means interposed between the shell members urging them apart. A shoulder on one of the shell members is adapted to be engaged by the flange when it is moved from one extreme or meshed position through the neutral range. There is a shoulder portion also on the other shell member which is adapted to be engaged by the flange portion when it is moved from the other extreme or meshed position through the neutral range. When the device is in the non-synchronizing neutral position and it is moved from such position toward one of the meshed positions, it does not function as a synchronizer because of the cooperation of the various solid and split pin structures in a manner disclosed in detail hereinafter.

Figure 4:
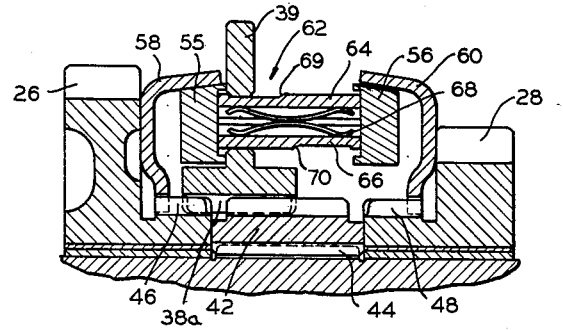
Figure 5:
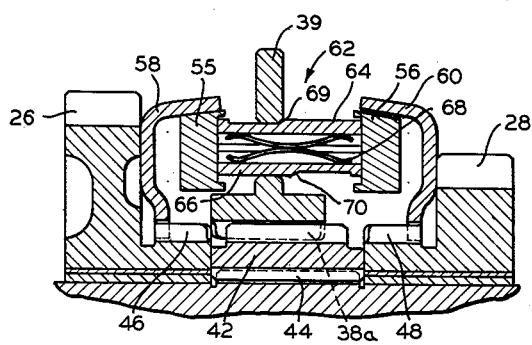
Figure 6:
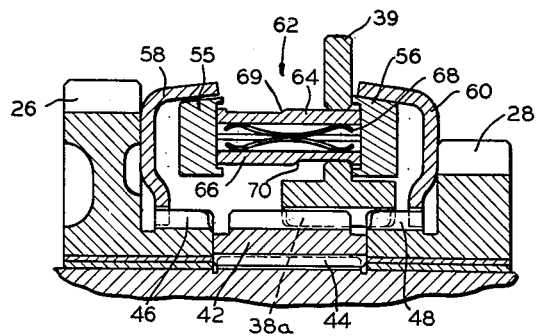
Figure 7:
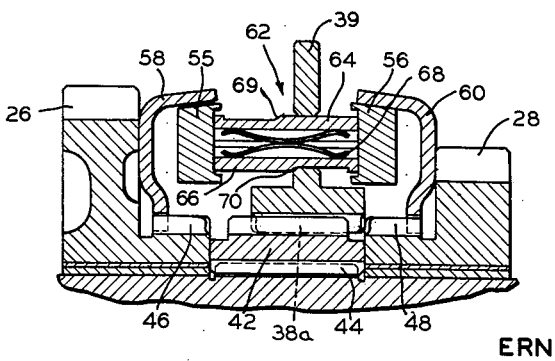

For a clearer and more complete understanding of the invention reference should be had to the accompanying drawing in which:

FIGURE 1 is a fragmentary view in longitudinal section of a transmission embodying the present invention, FIGURE 2 is an enlarged view of the synchronizer mechanism of FIG. 1, FIGURE 3 is a sectional view along the line 3—3 of FIG. 2, FIGURE 4 is a fragmentary view of the synchronizer mechanism in one operating position, FIGURE 5 is a view of the same fragmentary portion of the synchronizer mechanism in a transitory position, FIGURE 6 is a view of the same fragmentary portion of the synchronizer mechanism in another operating position, FIGURE 7 is a view of the same fragmentary portion of the synchronizer mechanism in another transitory position, FIGURE 8 is a fragmentary sectional view along the line 8—8 of FIG. 2, except with the parts in the axial position of FIG. 5, and FIGURE 9 is a fragmentary sectional view along the line 9—9 of FIG. 2 except with the parts in the axial position of FIG. 5 and with pin not in section.

Referring to FIG. 1, there is shown a portion of a constant mesh gear type change-speed transmission which is indicated generally by the numeral 10. The transmission illustrated is for a vehicle and is adapted to be connected in the drive line between the engine and the drive wheels in the usual manner to provide forward and reverse and a plurality of speed ratios. The portion of the transmission shown includes the input shaft together with gears and other parts associated therewith, the input shaft being indicated by the numeral 12. The transmission is enclosed in a housing 14 only a portion of which is visible.

The input shaft 12 is adapted to be driven by an engine (not shown) when a main friction clutch 16 of conventional type is engaged. The input shaft 12 is rotatably supported in the housing 14 by means of a ball bearing 18 which is carried by an inwardly extending circular bracket structure 20 and a ball bearing 22 which is mounted in an internal wall portion 24 of the transmission housing. A pair of gears 26 and 28 are rotatably mounted on shaft 12 and are arranged to be selectively clutched to the shaft. In the particular transmission illustrated gear 26 may be referred to as the forward gear inasmuch as when this gear is clutched to the shaft forward operation of the vehicle is provided, while clutching of gear 28 to shaft 12 provides for reverse operation. Forward gear 26 is constantly in mesh with a gear 30 which is secured to a countershaft 32 while gear 28 is in mesh with an idler gear, not shown, which in turn is in mesh with a gear 34 which likewise is secured to countershaft 32.

For selectively connecting either of the gears 26 or 28 to the shaft 12 a synchronizer and clutch mechanism indicated generally by the numeral 36 is provided. Mechanism 36 includes a collar member 38 which is connected by splines at 40 to an intervening sleeve member 42 which in turn is connected by splines at 44 to shaft 12. The interposition of sleeve 42 is merely to facilitate assembly. The gear 26 has an axially extending shoulder portion 26a which has a plurality of jaw teeth 46 around the periphery thereof. Teeth 46 are adapted to mesh with internal teeth 38a (see FIG. 2) on collar 38 (forming a portion of spline connection 40) when the collar 38 is moved to the left from the neutral range illustrated in FIGS. 1 and 2. Similarly gear 28 has an axially extending portion 28a which has external jaw teeth 48 thereon. The teeth 48 likewise are adapted to mesh with the internally extending teeth 38a on collar 38 when the collar is moved to the right from the neutral range.

Collar 38 has an outwardly projecting annular flange portion 39 thereon which has a plurality of circular openings 50 therethrough, in this case six openings as shown in FIG. 3. Extending through three of the openings are solid or blocker pins 52 which are of the shape seen best in FIG. 2. Each of the solid pins 52 has an enlarged portion 54 located at the center which fits within the corresponding opening 50 in flange portion 39 when the mechanism is in the non-synchronizing neutral position of FIGS. 1 and 2. At the ends of the solid pins 52 a pair of synchronizer rings 55 and 56 respectively are connected. The synchronizer rings are secured solidly to the blocker pins in a suitable manner such as by riveting the ends of the pins. Each of the synchronizer rings has a frusto-conical or tapered outer surface which is adapted to coact with members 58 and 60 respectively which are secured to the gears 26 and 28 respectively. Members 55 and 58 coact to form a friction clutch and members 56 and 60 coact to form another friction clutch. While members 58 and 60 are described and illustrated herein as separate members secured to gears 26 and 28 respectively, it will be appreciated that these members can be formed integrally with the gears in many applications, and it is convenient to do this particularly when the gears are of larger diameter relative to the other parts of the mechanism. Reference hereinafter in the claims to the synchronizer rings contacting the gears is intended to apply both to the synchronizer rings contacting separate members secured to the gears as shown or to the synchronizer rings contacting the gears directly.

Disposed through the other alternate openings 50 in the flange portion 39 are split or energizer pin assemblies indicated generally by the numeral 62 (see FIG. 2). Each split pin assembly comprises a pair of generally semicylindrical segments or shell members indicated by the numerals 64 and 66, between which segments are disposed two spring members 68 formed to the shape illustrated or other equivalent shape. The springs 68 bias the segment portions apart and normally urge such segments into contact with the inner peripheral surfaces of the respective openings 50. Segment 64 has a shoulder portion 69 thereon just to the left of center as may be seen clearly in FIG. 2, while segment 66 has a shoulder portion 70 thereon just to the right of center as may be seen in FIG. 2 likewise; the function of these shoulder portions is described in detail hereinafter. The split pin assemblies 62 are retained between the synchronizer rings 55 and 56, each such assembly abutting both these rings in suitable depressions therein as illustrated in the drawing.

In order to explain the operation of this mechanism let it be assumed first that the mechanism is shifted to the extreme left position as shown in FIG. 4 and that teeth 38a on the collar are in mesh with teeth 46 on the gear 26 thereby positively connecting this gear to sleeve 42 and thence to the shaft 12. If it is desired then to disconnect gear 26 and connect gear 28 to the shaft 12, the synchronizer and clutch mechanism is shifted from the extreme left position of FIG. 4 toward the right. Soon after the initiation of such movement the mechanism reaches the position illustrated in the fragmentary view of FIG. 5 at which teeth 38a disengage clutch teeth 46 and the flange portion 39 engages the shoulder portion 69 on the split pin assembly as shown. Then as the flange portion 39 is moved further toward the right, the split pin assembly, since it abuts the synchronizer ring 56, pushes the synchronizer ring toward the right until it engages portion 60 connected to gear 28. Such engagement causes the synchronizer rings and the blocker pins to move circumferentially slightly relative to flange 39, and thus causes the beveled edges on the openings 50 in flange 39 to abut the tapered ends on the enlarged central portions 54 on the blocker pins as indicated at 57 in FIG. 9 and further illustrated in FIG. 8. As mentioned previously, FIGURES 8 and 9 show the flange 39 to the left of the neutral non-synchronizing position, approximately in the position of FIG. 5. This transmits the full force of the shifting effort to the friction clutch, through the abutting surfaces on the flange and the blocker pins, and the speed of gear 28 is thereby synchronized with that of the synchronizer ring 56. When synchronization is achieved the flange 39 is unblocked, for the blocker pins then are permitted to move back (circumferentially) so that projections 54 are in alignment with openings 50 in flange 39. Thereafter continued motion of flange 39 toward the right compresses the spring 68 of the split ring assembly and allows the flange 39 to pass over the shoulder 68 and move on to the right whereby the teeth 38a on the collar 38 enter into meshing relation with the teeth 48 on gear 28 to provide a positive connection. FIG. 6 shows the situation of the parts after such a shift has been completed. While a single split pin assembly was used in this description of operation it will be appreciated that there are three such assemblies in the form of the invention described and illustrated herein and that all of them function simultaneously in the same manner. There are also three solid or blocker pins which function together.

FIG. 2 shows the condition of both the split pins and the solid pins when the mechanism is in the non-synchronizing neutral position. In this position none of the pins is affected by the movement of flange 39 or, in other words, when flange 39 is moved in either direction it does not attempt to move the solid pin and synchronizer ring structure with it because there are no abutting surfaces; therefore, there is no synchronizing action when movement of the shift collar is initiated from this position. It will be appreciated that this takes place because in the non-synchronizing neutral position the two shell portions of the split pins are already compressed and neither shoulder, 69 or 70, is in position to be engaged by movement of flange 39, while the enlarged portions 54 of the solid pins likewise offer no obstruction to the movement of the collar as the flange portion 39 of the collar is moved from the enlarged portions 54 toward either end. It will be appreciated from the preceding paragraph that the narrower diameter portions on either side of the enlarged portion 54 of the solid pins are to allow sufficient circumferential movement of the blocker pin and synchronizer ring assembly to permit the flange 39 to engage the enlarged portions 54 of the blocker pins, to provide pressure on the friction clutch and prevent engagement of the teeth of the positive clutch until synchronization has been achieved and the abutting surfaces are thereby unblocked.

When the mechanism is in the position illustrated in FIG. 6 and is moved from that position back toward the position illustrated in FIG. 4 a synchronizing action occurs in a similar manner to that described previously for the left to right movement. In this case the flange 39 contacts the shoulder portions 70 on shell members 66 and forces the synchronizer ring 55 into engagement with portion 58 on gear 26 which thereby engages flange 39 with enlarged portions 54 on the blocker pins, to produce a synchronizing action, after which continued movement of flange 39 causes the teeth 38a and 46 to go into mesh to connect the gear 26 positively to shaft 12.

The shifting of collar 38 is accomplished by a conventional shifter mechanism which includes a shifter fork 72 which is suitably connected to flange 39 and a shift lever 74 projecting outside the transmission housing 14 and connected to the shifter fork 72.

This mechanism is particularly valuable for use in a vehicle in which it is desirable to be able to shift from neutral into one operating position or the other while the vehicle is stationary. It has been found that synchronizer mechanisms such as that disclosed and claimed in the aforementioned Bixby patent are not adequate for such use. It will be appreciated that if shaft 12 is not rotating and gears 26, 28 likewise are not rotating that if an attempt is made to shift collar 38 to mesh tooth portion 38a thereon with one of the toothed portions 46 and 48 that it may be impossible to make such a shift if the tooth portions 38a do not line up properly with the spaces between the mating toothed portions. Under such circumstances the friction clutch in the synchronizer acts to hold the parts in the incorrect relation if both parts are stationary. With the present mechanism, when a shift is initiated from the non-synchronizing neutral position toward gear engagement in either direction there is no synchronizing action, that is, the friction type synchronizer clutches do not function. It is still possible, of course, for the jaw clutch teeth not to be in proper mating relation when such engagement is attempted but there is no friction clutch effective then attempting to hold them out of the correct relation and any slight movement of shaft 12 permits the two sets of jaw clutch teeth to mesh or engage. It will be understood of course that such meshing may be facilitated by the shaping of the end surfaces of the teeth in a known manner to cause them to tend to move toward meshing relation when they are in abutting relation. Ordinarily when a shift is made from one gear ratio to another instead of from neutral, one or more parts are already in motion in a vehicle transmission of the type illustrated, and the present mechanism provides synchronization under such circumstances as already described in detail hereinbefore.

While I have illustrated and described herein one preferred embodiment of my invention, modifications may be made by those skilled in the art. It should be understood therefore that I intend to cover by the appended claims all modifications which fall within the true spirit and scope of my invention. In the claims the position which has been referred to hereinbefore as the non-synchronizing neutral position is referred to sometimes as a neutral position or an intermediate neutral position.

I claim:

1. A synchronizer and clutch mechanism for selectively connecting either of two gears to a shaft upon which they are rotatably mounted comprising, a clutch collar member located between the gears and connected to the shaft for rotation therewith, a set of clutch teeth on each gear on the surface thereof confronting the said collar member, additional clutch teeth on the said collar member arranged to mesh with the said clutch teeth on the said gears when the clutch collar is shifted axially in either direction from an intermediate neutral range, an outwardly projecting flange portion on the said collar member having a plurality of apertures therethrough, at least two solid pins projecting axially through two of the said apertures, each of the said solid pins having an enlarged portion centrally thereof which is arranged to be located within the respective aperture when the mechanism is in a non-synchronizing neutral position, a pair of synchronizer rings secured to the respective ends of the said solid pins and arranged to engage respectively the two said gears upon movement of the solid pin and synchronizer ring structure axially in either direction from the said neutral range under certain conditions, a split pin device extending through one of the said apertures and abutting the said synchronizer rings at its ends, the said split pin device comprising two axially extending shell members and spreading means interposed between the said two shell members urging them apart, a shoulder portion on one of the said shell members adapted to engage the said flange portion when the said clutch collar member is moved from one extreme position thereof into the said neutral range, and a shoulder portion on the other said shell member adapted to engage the said flange portion when the said clutch collar is moved from the other extreme position into the said neutral range.

2. In a synchronizer mechanism having an intermediate annular member with a plurality of apertures therein located between a pair of synchronizer rings which are joined rigidly together by at least two solid pins extending through certain of the said apertures, enlarged portions on the solid pins located centrally thereof and defining a neutral position when the said enlarged portions are within the annular member, a split pin device extending through one of the said apertures and abutting the synchronizer rings at its ends, the said split pin device comprising two axially extending shell members and spreading means interposed between the said two shell members urging them apart, a shoulder portion on one of the said shell members adapted to engage the annular member when the annular member is moved from one extreme position toward the said neutral position but before it reaches the neutral position, and a shoulder portion on the other of said shell members adapted to engage the annular member when the annular member is moved from the other extreme position toward the said neutral position but before it reaches the neutral position.

3. In a synchronizer mechanism having an intermediate annular member with a plurality of apertures therein located between a pair of synchronizer rings which are joined rigidly together by a plurality of solid blocker pins extending through certain of the said apertures, enlarged portions on the solid pins located centrally thereof and defining a neutral position when the said enlarged portions are within the annular member, a plurality of split pin energizer devices extending through others of the said apertures and abutting the synchronizer rings at their ends, each of the said split pin devices comprising a pair of axially extending shell members and spreading means interposed between the two shell members urging them apart, a shoulder portion on one of each of the said pairs of said shell members on one side of the said neutral position of the annular member, a second shoulder portion on the other shell member of each pair located on the other side of the neutral position of the annular member, the said annular member adapted to engage the first said shoulder portions and the enlarged portions on the said solid pins when the annular member is moved from one extreme position toward the said neutral position but before it reaches the neutral position, and the annular member adapted to engage the said second shoulder portions and the said enlarged portions on the said solid pins when the annular member is moved from the other extreme position toward the said neutral position but before it reaches the neutral position.

4. In combination, a pair of coaxially arranged rotatable gears located in axially spaced apart relation, a coaxial rotatable collar member located between the said gears, the said collar member having a neutral position and being movable axially in either direction from the said neutral position, means for clutching the collar and one gear together when the collar is moved to an extreme position in one direction, additional means for clutching the collar and the other gear together when the collar is moved to the extreme position in the other direction, means for providing synchronization of either of the said gears with the said collar member before they are clutched together at an extreme position of the said collar member, and means preventing operation of said synchronization means when said collar member is moved initially from said neutral position toward an extreme position to effect such connection.

5. In a mechanism for selectively connecting an intermediate rotatable collar positively to either of a pair of rotatable gears located respectively adjacent the ends of the collar, a structure carried by the collar for rotation therewith but movable axially relative thereto comprising a pair of synchronizer rings located one adjacent each end of the said collar and arranged to frictionally engage the respective adjacent gear, means for actuating the said structure axially and moving one of the said synchronizer rings thereon into frictional engagement with its respective gear when the said collar is moved axially toward said respective gear, means preventing such actuation of the said structure when movement of the said collar is initiated from a predetermined neutral position, and means for connecting the collar positively to the respective gear.

6. A mechanism for selectively connecting an intermediate rotatable collar member to either of a pair of rotatable gears located respectively adjacent the ends of the collar member comprising, an outwardly projecting annular flange portion carried by the collar member for rotation therewith, the said flange portion having a plurality of apertures therethrough, a synchronizer structure carried by the said flange portion for rotation therewith but movable axially relative thereto, the said synchronizer structure comprising a pair of synchronizer rings located on each side of the said flange portion rigidly interconnected by a plurality of solid pins extending through certain of the said apertures in the flange portion, means for actuating the said synchronizer structure axially comprising split pin and solid or blocker pin devices extending between the said synchronizer rings through certain others of the said apertures in the said flange portion, the said synchronizer actuating means including shoulder portions on the said split pin and solid pin devices adapted to be engaged by the said flange portion when the flange portion is moved from one extreme axial position toward an intermediate neutral position, such engagement occurring before the neutral position is reached whereby if movement of the said flange portion is initiated from the said neutral position the said synchronizer actuating means is ineffectual, and means for connecting the collar members positively to each of the gears.

7. A mechanism for selectively connecting an intermediate rotatable collar member to either of a pair of rotatable gears located respectively adjacent the ends of the collar member comprising, an outwardly projecting annular flange portion carried by the collar member for rotation therewith, the said flange portion having a plurality of apertures therethrough, a synchronizer structure carried by the said flange portion for rotation therewith but movable axially relative thereto, the said synchronizer structure comprising a pair of synchronizer rings located on each side of the said flange portion rigidly interconnected by a plurality of solid blocker pins extending through certain of the said apertures in the flange portion, the said synchronizer structure also including a plurality of split pin energizer devices extending between the said synchronizer rings through certain others of the said apertures in the said flange portion, shoulder portions on the said solid blocker pins and on the said split pin energizer devices adapted to be engaged by the said flange portion when the flange portion is moved from one extreme axial position toward an intermediate neutral position, the said flange portion becoming disengaged from the said shoulder portions allowing axial movement of the intermediate rotatable collar to continue after synchronization has been achieved between such intermediate collar and the gear which it is desired to connect to the intermediate collar, and positive clutch means for connecting the intermediate collar member selectively to each of the gears.

8. A mechanism for selectively connecting a collar member which is mounted on a rotatable shaft for rotation therewith but slidable axially relative thereto positively to either of a pair of gears rotatably mounted on the shaft respectively adjacent the ends of the collar member comprising, an outwardly projecting annular flange portion carried by the collar member for rotation therewith, the said flange portion having a plurality of apertures therethrough, a synchronizer structure carried by the said flange portion for rotation therewith but movable axially relative thereto, the said synchronizer structure comprising a pair of synchronizer rings located on each side of the flange portion and adapted to frictionally engage respectively the two gears, a plurality of solid pins projecting through certain of the said apertures in the flange portion and rigidly interconnecting the said two synchronizer rings, means for actuating the said synchronizer structure comprising split pin devices extending between the said synchronizer rings through certain others of the said apertures, the said synchronizer actuating means including two sets of shoulder portions on the said split pin devices, one said set adapted to be engaged by the said flange portion when the flange portion is moved from one extreme axial position toward an intermediate neutral position, the other said set adapted to be engaged by the said flange portion when the flange portion is moved from the other extreme axial position toward the said neutral position, the engagement of the said flange portion with either of the said sets of shoulder portions occurring before the said neutral position is reached whereby if movement of the said flange portion is initiated from the neutral position the said synchronizer means are ineffectual, and positive clutch means for connecting the collar member to each of the gears.

9. In combination, a pair of coaxially arranged rotatable gears located in axially spaced apart relation, a coaxial rotatable collar member located between the said gears, the said collar member having a neutral range and being movable axially in either direction from the said neutral range, means for clutching the said collar and one said gear together when the collar is moved to an extreme position in one direction, additional means for clutching the said collar and the said other gear together when the collar is moved to the extreme position in the other direction, means providing for synchronization of each of the said gears with the said collar member before they are clutched together at an extreme position of the collar member comprising a structure carried by the collar member for rotation therewith but movable axially relative thereto, the said structure including a pair of synchronizer rings located one adjacent each end of the said collar member and arranged to engage frictionally the respective adjacent gear, and means preventing operation of the said synchronizer means when movement of the said collar member is initiated from a non-synchronizing neutral position.

10. In combination, a pair of coaxially arranged rotatable gears located in axially spaced apart relation, a coaxial rotatable collar member located between the said gears, the said collar member having a neutral range and being movable axially in either direction from the said neutral range, means for clutching the said collar and one of the said gears together when the collar is moved to an extreme position in one direction, additional means for clutching the said collar and the said other gear together when the collar is moved to the extreme position in the other direction, means providing for synchronization of each of the said gears with the said collar member before the gear and collar member are clutched together at an extreme position of the collar member, the said synchronization means comprising a flange portion on the said collar member and a synchronizer structure carried by the said flange portion for rotation therewith but movable axially relative thereto, the said synchronizer structure including a pair of synchronizer rings located one adjacent each end of the said collar member and arranged to engage frictionally the respective adjacent gear, means for actuating the said synchronizing structure axially, and means preventing actuation of the said synchronizing structure axially when movement of the said collar member is initiated from a non-synchronizing neutral position.

11. In combination, a pair of coaxially arranged rotatable gears located in axially spaced apart relation, a rotatable collar member coaxially located between the said gears, the said collar member having a neutral range and being movable axially in either direction from the said neutral range, means for clutching the said collar and one of the said gears together when the collar is moved to an extreme position in one direction, additional means for clutching the said collar and the said other gear together when the collar is moved to the extreme position in the other direction, means for providing for synchronization of each of the said gears with the said collar member before the gear and collar member are clutched together at an extreme position of the collar member, said synchronization means comprising a flange portion on the said collar member having a plurality of apertures therethrough and a synchronizer structure carried by the said flange portion for rotation therewith but movable axially relative thereto, the said synchronizer structure including a pair of synchronizer rings located one adjacent each end of the said collar member and arranged to engage frictionally the respective adjacent gear, means for actuating the said synchronizer structure axially comprising split pin devices extending between the said synchronizer rings through the said apertures in the flange portion, the said synchronizer actuating means including two sets of shoulder portions on the said split pin devices adapted to be engaged by the said flange portion when the flange portion is moved from either extreme axial position through the said neutral range, such engagement occurring before a central non-synchronizing position is reached whereby when movement of the said flange portion is initiated from the said central non-synchronizing position the said synchronizer actuating means is ineffectual.

12. In combination, a pair of coaxially arranged rotatable gears located in axially spaced apart relation, a rotatable collar member located coaxially between the said gears, the said collar member having a neutral range and being movable axially in either direction from the said neutral range, means for clutching the said collar and one of the said gears together when the collar is moved to an extreme position in one direction, additional means for clutching the said collar and the said other gear together when the collar is moved to the extreme position in the other direction, means providing for synchronization of each of the said gears with the said collar member before the gear and collar member are clutched together at an extreme position of the collar member, said synchronization means comprising a flange portion on the said collar member having a plurality of apertures therethrough and a synchronizer structure carried by the said flange portion for rotation therewith but movable axially relative thereto, the said synchronizer structure including a pair of synchronizer rings located one adjacent each end of the said collar member and arranged to engage frictionally the respective adjacent gear and a plurality of blocker pins interconnecting the said synchronizer rings and extending through certain of said apertures, means for actuating the said synchronizer structure axially comprising a plurality of split pin devices extending between the said synchronizer rings through others of the said apertures in the flange portion, the said synchronizer actuating means including two sets of shoulder portions on the said split pin devices and the two sets of shoulder portions on the said blocker pins, one set of the shoulder portions on the said split pin devices and one set of the said shoulder portions on the solid pins adapted to be engaged by the said flange portion when the flange portion is moved from either extreme axial position through the said neutral range, such engagement occurring before a non-synchronizing neutral position is reached, the said non-synchronizing neutral position occurring between the said sets of shoulder portions on the blocker pins whereat such pins are provided with enlarged portions thereon and also between the said sets of shoulder portions on the split pin devices whereby when movement of the said flange portion is initiated from the said non-synchronizing neutral position the said synchronizer actuating means are ineffectual.

13. In a mechanism for selectively connecting an intermediate rotatable member positively to either of a pair of rotatable members located respectively adjacent the ends of the intermediate member, means for shifting the intermediate member into engagement with either of the said pair of rotatable members, means for producing synchronization of either of the said pair of rotatable members with the intermediate member before such engagement when a shift is made of the intermediate member from engagement with one of the said pair to engagement with the other without stopping at an intervening neutral position, and additional means for rendering said synchronization producing means ineffectual when movement of the said intermediate member is initiated from the said neutral position.

14. In a mechanism for selectively connecting an axially movable intermediate rotatable member positively to either of a pair of rotatable members located respectively adjacent the ends of the intermediate member, means including a portion on the said intermediate member for shifting the intermediate member into engagement with either of the said pair of rotatable members, means responsive to the said shifting means for producing synchronization of either of the said pair of rotatable members with the said intermediate member before engagement is made between them, and additional means for rendering the said synchronization producing means ineffectual when shifting movement of the said intermediate member is initiated from a predetermined neutral position centrally of the axial travel of the intermediate member.

References Cited in the file of this patent

UNITED STATES PATENTS

| | | |
|---|---|---|
| 2,425,203 | Peterson et al. | Aug. 5, 1947 |
| 2,667,955 | Bixby | Feb. 2, 1954 |